(12) United States Patent
Hong et al.

(10) Patent No.: US 10,322,509 B2
(45) Date of Patent: Jun. 18, 2019

(54) WHEEL NUT ENGAGEMENT CHECKING SYSTEM AND CHECKING METHOD

(71) Applicants: HYUNDAI MOTOR COMPANY, Seoul (KR); KIA MOTORS CORPORATION, Seoul (KR)

(72) Inventors: Jin Young Hong, Yongin-si (KR); Jung Su Gong, Anyang-si (KR); Sung Hee Ryu, Suwon-si (KR); Jung Whan Yeum, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 259 days.

(21) Appl. No.: 15/387,259

(22) Filed: Dec. 21, 2016

(65) Prior Publication Data

US 2017/0334073 A1  Nov. 23, 2017

(30) Foreign Application Priority Data

May 18, 2016  (KR) .................. 10-2016-0060760

(51) Int. Cl.
*G01L 5/24* (2006.01)
*B25J 9/16* (2006.01)
(Continued)

(52) U.S. Cl.
CPC .......... *B25J 9/1694* (2013.01); *B23P 19/066* (2013.01); *B62D 65/005* (2013.01); *G01L 5/24* (2013.01);
(Continued)

(58) Field of Classification Search
None
See application file for complete search history.

(56) References Cited

U.S. PATENT DOCUMENTS 3,354,705 A * 11/1967 Dyer, Jr. ............... G01L 5/0042
 73/761
4,894,767 A *  1/1990 Doniwa ............... B23P 19/066
 173/183

(Continued)

FOREIGN PATENT DOCUMENTS

JP  7-108426 A  4/1995
JP  7-237402 A  9/1995
(Continued)

*Primary Examiner* — Peter J Macchiarolo
*Assistant Examiner* — Jermaine L Jenkins
(74) *Attorney, Agent, or Firm* — Morgan Lewis & Bockius LLP (57) ABSTRACT

A wheel nut engagement checking system for a vehicle delivered by a conveyor includes: a moving member disposed at one side of the conveyor; a wheel lifting apparatus disposed on the moving member, and lifting a wheel of the vehicle from the conveyor to a predetermined height; a wheel nut torque checking apparatus provided on an arm of a robot disposed on the moving member, engaging a nut runner to a wheel nut of the wheel, and checking an engage torque of the wheel nut by rotating the nut runner; and a controller controlling a speed of the moving member, lifting the wheel to the predetermined height using the wheel lifting apparatus, moving the wheel nut torque checking apparatus using the robot so as to engage the nut runner to the wheel nut, and detecting an engage torque of the wheel nut by rotating the nut runner.

15 Claims, 13 Drawing Sheets

(51) Int. Cl.
  *B23P 19/06* (2006.01)
  *B62D 65/00* (2006.01)
(52) U.S. Cl.
  CPC ............ *G05B 2219/45021* (2013.01); *G05B 2219/45091* (2013.01); *G05B 2219/50073* (2013.01); *G05B 2219/50197* (2013.01); *Y10S 901/44* (2013.01); *Y10S 901/46* (2013.01)

(56) References Cited

U.S. PATENT DOCUMENTS

| | | | | |
|---|---|---|---|---|
| 5,125,298 | A * | 6/1992 | Smith | B23P 19/006 29/798 |
| 5,229,931 | A * | 7/1993 | Takeshima | G05B 19/0421 700/169 |
| 5,640,750 | A * | 6/1997 | Yoshida | B23Q 7/1426 29/281.5 |
| 6,105,475 | A * | 8/2000 | Ohmi | B23P 19/066 81/429 |
| 6,196,089 | B1 * | 3/2001 | Choi | B23P 19/069 81/57.22 |
| 8,025,106 | B2 * | 9/2011 | Schmidt | B25B 23/14 173/1 |
| 8,776,345 | B2 * | 7/2014 | Komatsu | B23P 19/069 29/430 |
| 9,978,190 | B2 * | 5/2018 | Lopes | B60B 3/16 |

FOREIGN PATENT DOCUMENTS

| | | |
|---|---|---|
| JP | 9-257657 A | 10/1997 |
| JP | 2011-220703 A | 11/2011 |
| JP | 2013-257303 A | 12/2013 |
| KR | 10-2000-0020317 A | 4/2000 |
| KR | 10-1995-0003117 A | 8/2002 |
| KR | 10-1506363 B1 | 3/2015 |

* cited by examiner

WHEEL NUT ENGAGEMENT CHECKING SYSTEM AND CHECKING METHOD

CROSS-REFERENCE TO RELATED APPLICATION

This application claims the benefit of priority to Korean Patent Application No. 10-2016-0060760, filed in the Korean Intellectual Property Office on May 18, 2016, the entire content of which is incorporated herein by reference.

TECHNICAL FIELD

The present disclosure relates to a wheel nut engagement checking system capable of lifting a wheel for a vehicle which is moved along a conveyor, moving the wheel by a set speed, and checking an engage torque of a wheel nut for fixing the wheel.

BACKGROUND

In general, a vehicle wheel is engaged to a hub, and in the case of a vehicle with four wheels, four wheels are mounted on the vehicle. Furthermore, a brake is coupled with a hub by an axle and a wheel is engaged to the hub through a wheel nut.

A hub bolt and a wheel nut are used for mounting the wheel to the hub, and the wheel is fixed to the hub by tightening the wheel nut with a set torque. Research for improving productivity by rapidly tightening the wheel nut with a set torque is currently underway.

A vehicle assembly line may be used for assembling various vehicles, and an automatic wheel assembly system may treat various wheels corresponding to various vehicles. An ordinary automatic wheel assembly system cannot be applied to a vehicle assembly line for assembling various vehicles, however, because the position of assembling the wheel is to be different depending on the type of wheel hub.

Further, a vehicle may be delivered with a set speed on a conveyor in a vehicle assembly line. In this regard, it may be difficult to deliver the vehicle with a set speed depending on the characteristics of the conveyor, and it may be more difficult to engage a wheel nut to the vehicle which is delivered with a non-uniform speed and to check an engage torque of the wheel nut.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a wheel nut engagement checking system and a checking method having advantages of lifting a wheel for a vehicle which is moved along a conveyor, moving the wheel by a set speed, and checking an engage torque of a wheel nut for fixing the wheel.

A wheel nut engagement checking system according to an exemplary embodiment in the present disclosure may be a wheel nut engagement checking system for a vehicle which is delivered by a conveyor such that a wheel is mounted thereto by a wheel nut According to one aspect of the present disclosure, a wheel nut engagement checking system for a vehicle delivered by a conveyor may comprise: a moving member disposed at one side of the conveyor; a wheel lifting apparatus disposed on the moving member, and lifting a wheel of the vehicle from the conveyor to a predetermined height; a wheel nut torque checking apparatus provided on an arm of a robot disposed on the moving member, engaging a nut runner to a wheel nut of the wheel, and checking an engage torque of the wheel nut by rotating the nut runner; and a controller controlling a speed of the moving member, lifting the wheel to the predetermined height using the wheel lifting apparatus, moving the wheel nut torque checking apparatus using the robot so as to engage the nut runner to the wheel nut, and detecting an engage torque of the wheel nut by rotating the nut runner.

The wheel lifting apparatus may include first and second lifting arms rotatably disposed at a front and a rear of the moving member such that front end portions of the first and second lifting arms are disposed toward a lower portion of a center portion of the wheel; and lifting rollers rotatably disposed at the respective front end portions of the first and second lifting arms and contacting an exterior circumference of the wheel.

The wheel lifting apparatus may further include an arm driving portion providing a driving torque for spreading the first and second lifting arms or for approaching the first and second lifting arms with each other, and a locking device fixing the first and second lifting arms on a state that the first and second lifting arms lift the wheel.

The lifting roller may include a fixed roller fixed to the front end portion of the lifting arm, a rotational roller rotatably disposed at an outside of the fixed roller, and a latching member disposed between the fixed roller and the rotational roller so as to lock such that the rotational roller is rotated in one direction with respect to the fixed roller.

A rear end portion of the latching member may be disposed to be rotated around a pin of the fixed roller, and a latching groove may be formed at an interior circumference of the rotational roller, and the rotational roller may be not rotated in the other direction as a front end portion of the latching member is hooked to the latching groove.

The wheel nut torque checking apparatus may include a nut runner engaged to the wheel nut, a nut rotating portion disposed to rotate the nut runner, and a torque detecting sensor disposed on torque transferring route between the nut rotating portion and the nut runner so as to detect a torque, and the controller may determine an engage condition of the wheel nut by using a torque detection signal detected in the torque detecting sensor.

The wheel nut torque checking apparatus may further include a vision sensor detecting a position of the wheel nut and a displacement sensor measuring a distance with a front object, and the controller may detect the wheel nut through the vision sensor and control the robot such that the nut runner is engaged to the wheel nut.

The wheel nut torque checking apparatus may further include a runner moving portion disposed to vary a position of the nut runner, and the controller may detect a position and a pitch of the wheel nut through the vision sensor or the displacement sensor and control a position of the nut runner by controlling the runner moving portion depending on the detected position and pitch the wheel nut.

The nut runner may be provided by at least three, and a guide slot may be formed at the wheel nut torque checking apparatus so as to guide the movement of the nut runner.

The controller may detect a position and the number of the wheel nuts mounted to the wheel, and vary a position of the nut runner based on the detected data such that the nut runners are engaged to all wheel nuts mounted to the wheel.

The wheel nut engagement checking system may be provided to be moved in a set direction or be rotated at the arm of the robot.

A wheel nut engagement checking method according to an exemplary embodiment of the present invention may include delivering a vehicle loaded on a conveyor, lifting a wheel as a predetermined height from the conveyor by using a lifting apparatus, delivering the vehicle in a delivering direction with a set speed on a state of lifting the vehicle by the lifting apparatus, engaging a nut runner to a wheel nut by detecting the wheel nut fixing the wheel to an axle of the vehicle and moving a wheel nut torque checking apparatus, detecting an engage torque of the wheel nut by rotating the nut runner, and descending the vehicle on the conveyor after separating the lifting apparatus from the wheel.

The lifting apparatus and the wheel nut torque checking apparatus may be mounted on one moving member of a delivering apparatus.

The wheel and the wheel nut may be detected through a vision sensor disposed at the wheel nut torque checking apparatus.

The wheel nut torque checking apparatus may be delivered by using a robot mounted to the moving member.

A position of the wheel nut may be detected by the vision sensor, and a position of the nut runner may be varied to be corresponded with the detected position.

According to an exemplary embodiment of the present invention, productivity and stability can be improved by lifting a wheel of a vehicle moving on the conveyor and moving the wheel by using a lifting apparatus and checking an engage torque of a wheel nut for fixing the wheel by using wheel nut torque checking apparatus.

DETAILED DESCRIPTION OF THE EMBODIMENTS

Hereinafter, exemplary embodiments of the present disclosure will be described in detail with reference to the accompanying drawings.

The size and thickness of each component illustrated in the drawings are arbitrarily shown for better understanding and ease of description, but the present disclosure is not limited thereto. Thicknesses are enlarged to clearly express various portions and areas.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Figure 1:
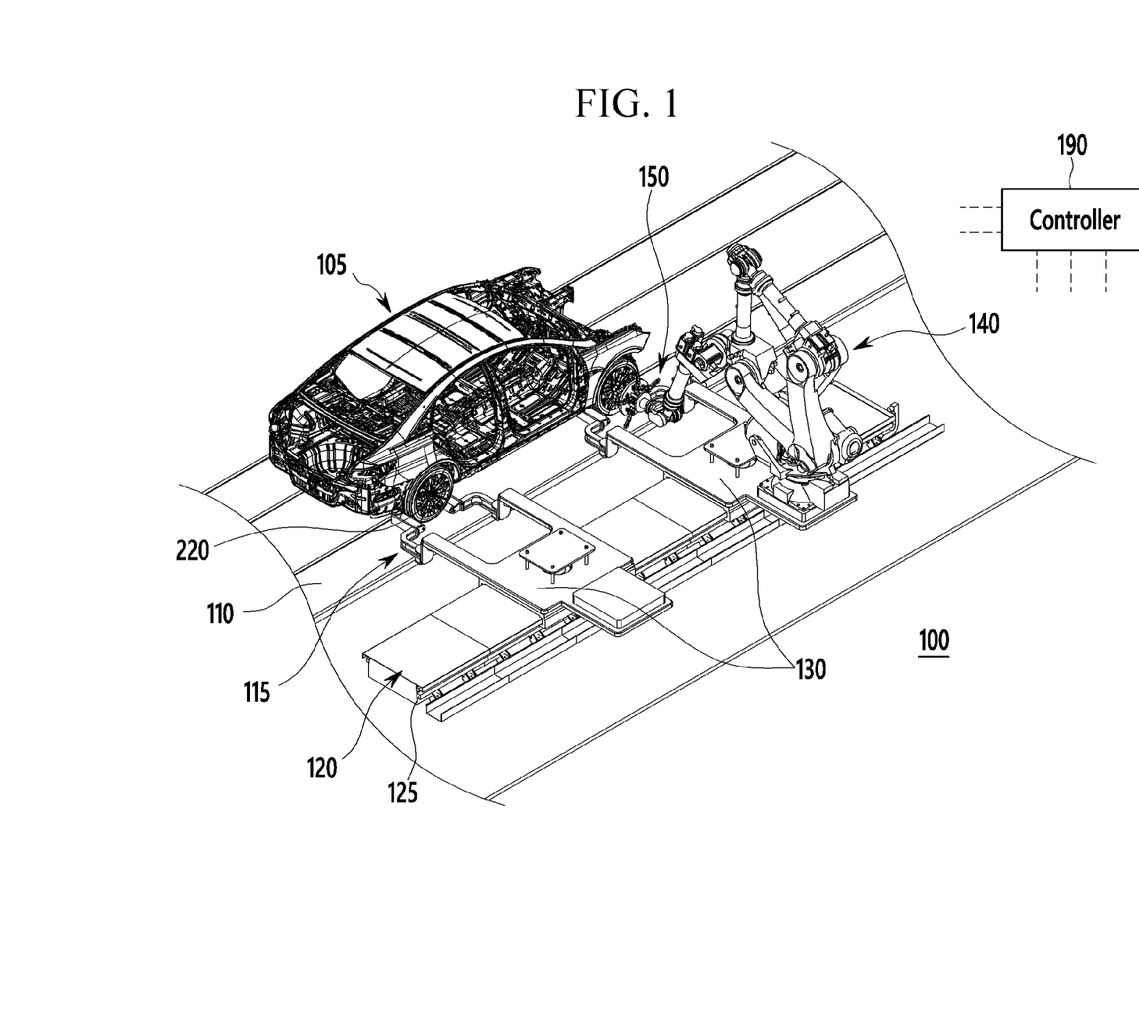
FIG. 1 is a perspective view of a wheel nut engagement checking system according to an exemplary embodiment of the present disclosure.
Figure 2:
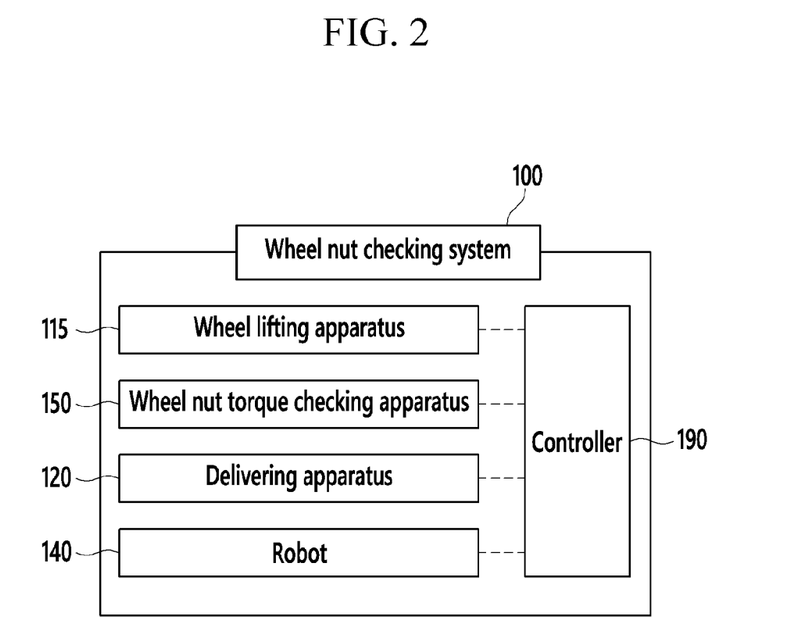
FIG. 2 is a schematic diagram of a wheel nut engagement checking system according to an exemplary embodiment of the present disclosure.

FIG. 1 is a perspective view of a wheel nut engagement checking system according to an exemplary embodiment of the present disclosure, and FIG. 2 is a schematic diagram of a wheel nut engagement checking system according to an exemplary embodiment of the present disclosure.

Referring to FIG. 1 and FIG. 2, a wheel nut checking system 100 includes a conveyor 110, a vehicle 105, a wheel 220, a wheel lifting apparatus 115, a delivering apparatus 120, a rail 125, a moving member 130, a robot 140, a wheel nut torque checking apparatus 150, and a controller 190.

Four wheels 220 are disposed at the left and the right in the front and the rear of the vehicle 105, and the wheel 220 is rotatably mounted to a hub (not shown). In addition, the vehicle 105 is disposed on the conveyor 110 through the wheel 220, and the conveyor 110 delivers the vehicle 105 at a predetermined speed in a flow direction.

The delivering apparatus 120 is respectively disposed at both sides of the conveyor 110. The delivering apparatus 120 includes the moving member 130 being disposed on the rail 125 and the rail 125 which are disposed along a moving direction of the conveyor 110.

The moving members 130 are disposed at front wheels and rear wheels at the left and right sides of the vehicle 105 and are disposed to move in a moving direction of the conveyor 110 on the rail 125, and for convenience of explanation, the moving member 130 is illustrated at the right side of the vehicle 105 in FIG. 1.

In an exemplary embodiment of the present disclosure, detailed description of a structure that the moving member 130 is moved on the rail 125 will be omitted.

Further, the robot 140 may be disposed to correspond with the front wheel and be disposed to correspond with the rear wheel, and the wheel nut torque checking apparatus 150 may be disposed at a front end of a robot arm 255 (referring to FIG. 3) of the robot 140.

For convenience of explanation, the robot 140 and the wheel nut torque checking apparatus 150 are disposed to correspond with the front wheel and a robot and a wheel nut checking apparatus, which correspond with the rear wheel, are omitted in FIG. 1, and the robot 140 and the wheel nut torque checking apparatus 150 may be provided to the right side and the left side of the vehicle.

First, when the vehicle enters, the controller 190 detects the vehicle through a vision sensor 240 (referring to FIG. 3), and the moving member 130 disposed on the rail 125 is moved with a set speed in a direction of moving the vehicle 105 on a position corresponding with the vehicle 105.

In addition, the wheel lifting apparatus 115 disposed at a portion corresponding with the wheel 220 of the vehicle 105 in the moving member 130 lifts the vehicle 105 by lifting a lower portion of the wheel 220 upwardly.

The robot 140 mounted to the moving member 130 moves the wheel nut torque checking apparatus 150 to a position corresponding with the wheel 220, and the wheel nut torque checking apparatus 150 checks an engage torque of a wheel nut 310 (referring to FIG. 4) engaged with the wheel 220.

The wheel nut torque checking apparatus 150 is separated from the wheel 220 by the robot 140, and the wheel lifting apparatus 115 lowers the wheel 220 on the conveyor 110 and then is separated from the wheel 220.

The controller 190 maintains an engage torque of the wheel nut 310 in a set range after rotating the wheel nut 310 with a predetermined torque by using the wheel nut torque checking apparatus 150 and detects whether the wheel nut 310 is loosely or excessively tightened.

Further, the moving speed of the vehicle 105 moving through the conveyor 110 may be non-uniform depending on a characteristic of the conveyor 110, and the vehicle 105 is lifted by the wheel lifting apparatus 115.

In this state, as the wheel lifting apparatus 115, the robot 140, and the wheel nut torque checking apparatus 150 are moved with an equal speed together with the moving member 130, the wheel nut torque checking apparatus 150 and the wheel nut 310 may be exactly matched.

The controller 190 is composed by at least one microprocessor being operated depending on a predetermined program, and the predetermined program may have a series of commands for performing a method according to an exemplary embodiment of the present invention.

Figure 3:
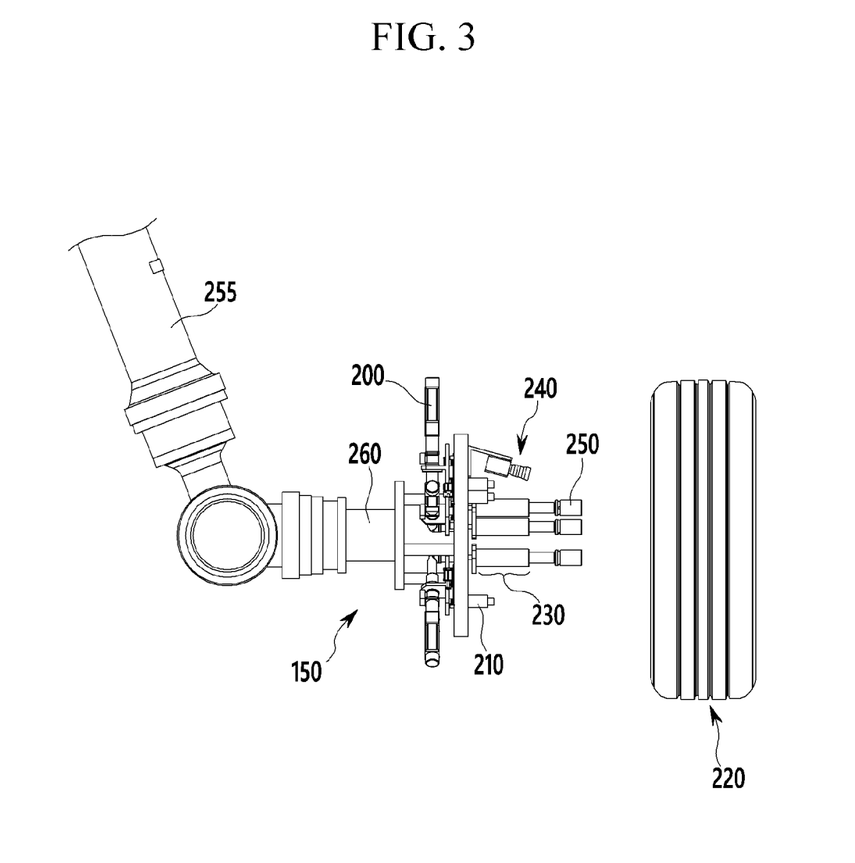
FIG. 3 is a side view of a wheel nut torque checking apparatus according to an exemplary embodiment of the present disclosure.

FIG. 3 is a side view of a wheel nut torque checking apparatus according to an exemplary embodiment of the present disclosure.

Referring to FIG. 3, a wheel nut torque checking apparatus 150 includes a robot arm 255, a floating device 260, a nut rotating portion 200, a vision sensor 240, a nut runner 250, a cushion portion 230, and a displacement sensor 210.

The vision sensor 240 detects the vehicle 105 and the wheel 220 by image information, and transmits the detected information to the controller 190. Further, the displacement sensor 210 prevents collision by detecting a distance with a front object such as the vehicle 105, the wheel 220, or a worker, and detects the wheel 220 or wheel nut 310 so as to transmit the detected information to the controller 190.

The nut runner 250 is a portion which is substantially engaged with the wheel nut 310 of the wheel 220, and tightens or disengages the wheel nut 310 by using a torque of the nut rotating portion 200.

On torque transferring route between the nut rotating portion 200 and the nut runner 250, a torque detecting sensor 325 (referring FIG. 4) is disposed and a cushion portion 230 for absorbing impact or displacement when engaging the nut runner 250 and the wheel nut 310 is disposed.

Further, the floating device 260 is configured to move the wheel nut torque checking apparatus 150 upwardly or downwardly at a front end portion of the robot arm 255 and to rotatably couple the wheel nut torque checking apparatus 150 with the front end portion of the robot arm 255, thereby improving the accuracy of the device.

Figure 4:
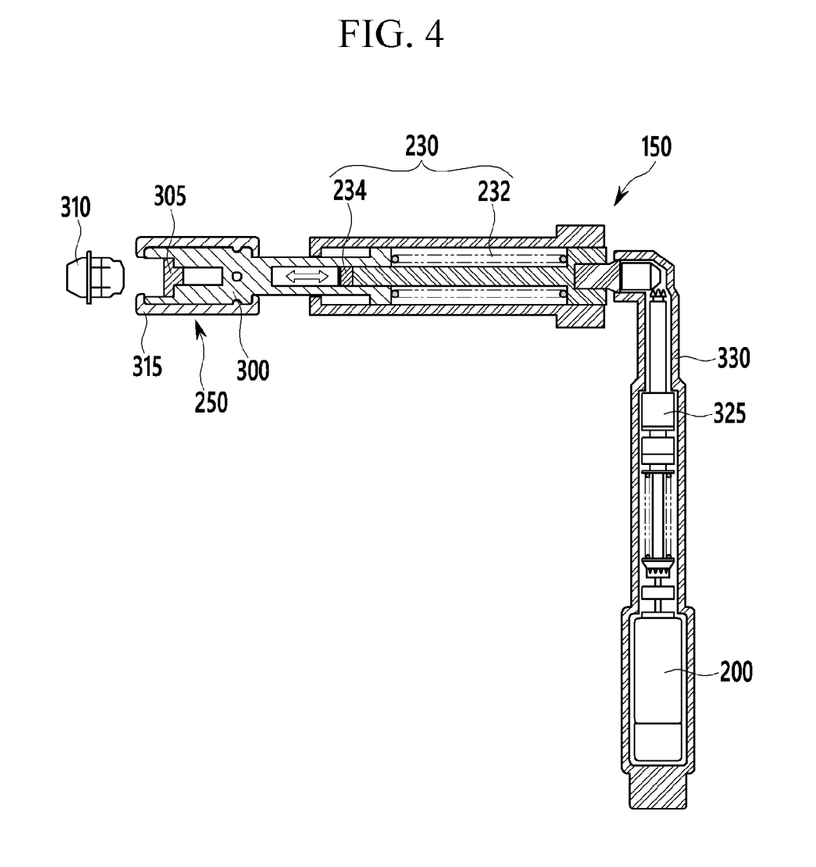
FIG. 4 is a partial cross-sectional view of a wheel nut torque checking apparatus according to an exemplary embodiment of the present disclosure.

FIG. 4 is a partial cross-sectional view of a wheel nut torque checking apparatus according to an exemplary embodiment of the present disclosure.

Referring to FIG. 4, the wheel nut torque checking apparatus 150 includes a nut rotating portion 200, a torque detecting sensor 325, a case 330, an elastic member 232, a damper 234, a socket 300, a nut runner 250, an absorbing member 315, and a magnet 305, and the nut runner 250 has a structure configured to engage to the wheel nut 310.

The nut rotating portion 200 generates a torque, and the torque detecting sensor 325 is disposed on a torque transferring route between the cushion portion 230 and the nut rotating portion 200 so as to detect a torque transferred to the nut runner 250.

The cushion portion 230 includes an elastic member 232 elastically pushing the socket 300 toward a front end portion thereof and a damper 234 absorbing impact between a rear end portion of the socket 300 and a rod disposed at a center portion of the elastic member 232.

The socket 300 is a portion which is substantially engaged to the wheel nut 310, and the magnet 305 adhered to the wheel nut 310 is provided to an inside thereof, and the absorbing member 315 (which may be made of, for example, silicon) is formed with a set thickness at an exterior circumference of the front end portion of the socket 300.

The torque transferring route formed by the nut rotating portion 200 and the torque detecting sensor 325 and the torque transferring route formed by the cushion portion 230 and the socket 300 may be disposed in vertical, and may be connected by a gear structure disposed in the case 330.

Figure 5:
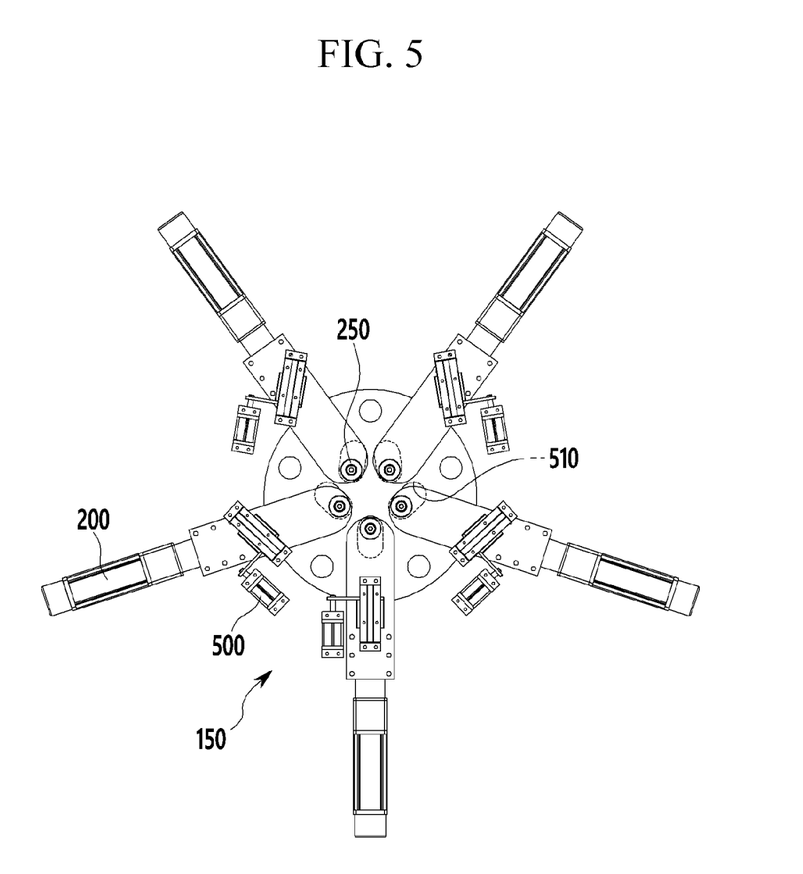
FIG. 5 is a partial front view of a wheel nut torque checking apparatus according to an exemplary embodiment of the present disclosure.

FIG. 5 is a partial front view of a wheel nut torque checking apparatus according to an exemplary embodiment of the present disclosure.

Referring to FIG. 5, a wheel nut torque checking apparatus 150 includes a nut rotating portion 200, a runner moving portion 500, a guide slot 510, and a nut runner 250.

The nut rotating portion 200 provides a torque for rotating the nut runner 250, and the runner moving portion 500 performs a function of moving the nut runner 250 along the guide slot 510.

As shown in FIG. 5, the nut runner 250 may be provided in plural (for example, five, but not limited thereto), and the number of nut runners 250 may be determined depending on a design. For example, when five wheel nuts 310 are disposed at the wheel 220, five nut runners 250 may correspond with all wheel nuts 310 as the runner moving portion 500 moves the nut runner 250 along the guide slot 510.

Further, in case that four wheel nut 310 are disposed at the wheel 220, four nut runners 250 may correspond with all wheel nuts 310 as the runner moving portion 500 moves the nut runner 250 along the guide slot 510.

Figure 6A:
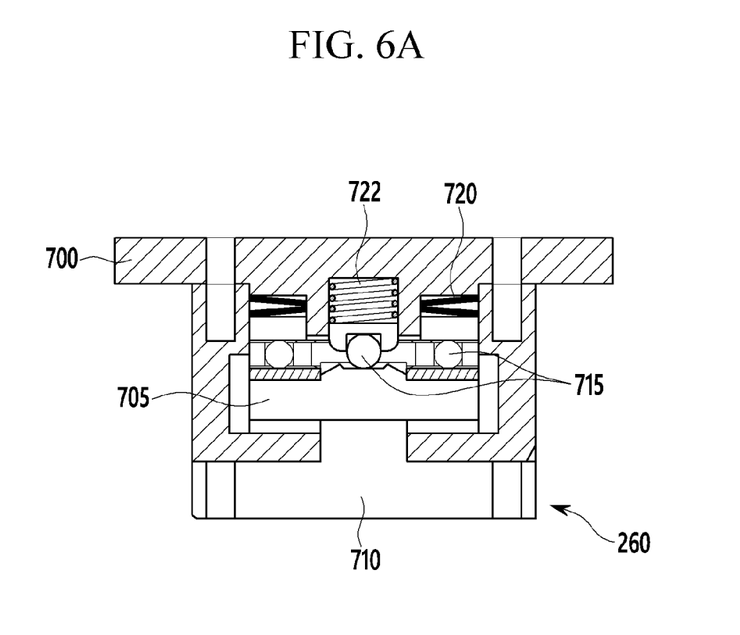
FIGS. 6A and 6B are drawings illustrating a partial cross-sectional view and a partial side view of a wheel nut torque checking apparatus according to an exemplary embodiment of the present disclosure.
Figure 6B:
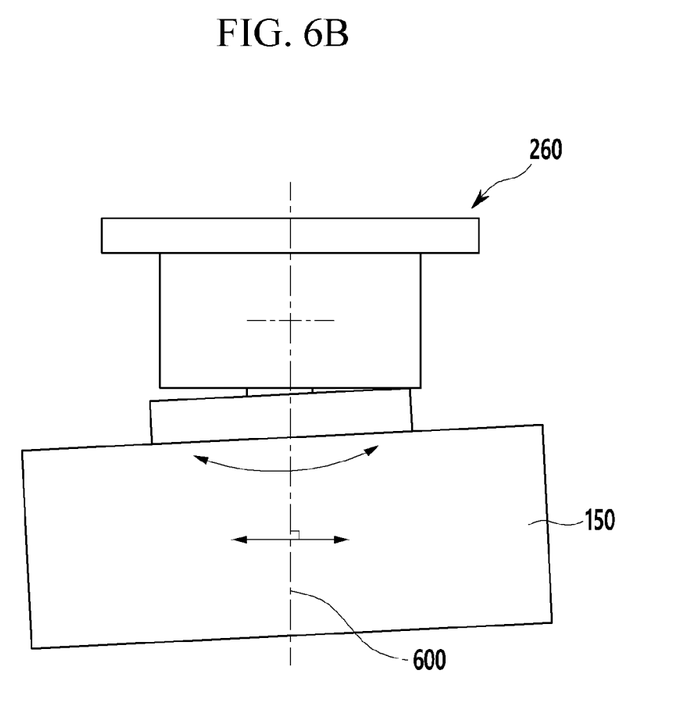

FIGS. 6A and 6B are drawings illustrating a partial cross-sectional view and a partial side view of a wheel nut torque checking apparatus according to an exemplary embodiment of the present disclosure.

Referring to FIG. 6A, the floating device 260 includes a fixing bracket 700, a center elastic member 722, an edge elastic member 720, a bearing 715, a floating member 705, and a mounting member 710.

The fixing bracket 700 is fixed to the front end portion of the robot arm 255, and the floating member 705 and the mounting member 710 are fixed to each other, and the wheel nut torque checking apparatus 150 is mounted to be fixed to a front end surface of the mounting member 710.

Referring to FIG. 6B, the mounting member 710 is disposed to be moved together with the floating member 705 in a vertical direction with respect to a center shaft 600 which crosses the fixing bracket 700 and the mounting member 710 or to be rotated around a bearing 715 which is disposed at a center portion.

The center elastic member 722 and the edge elastic member 720 elastically support the floating member 705 toward the front end portion (downward in FIGS. 6A and 6B) with respect to the fixing bracket 700, and the edge elastic member 720 has a structure to be expanded or compressed when the mounting member 710 is rotated.

Figure 7:
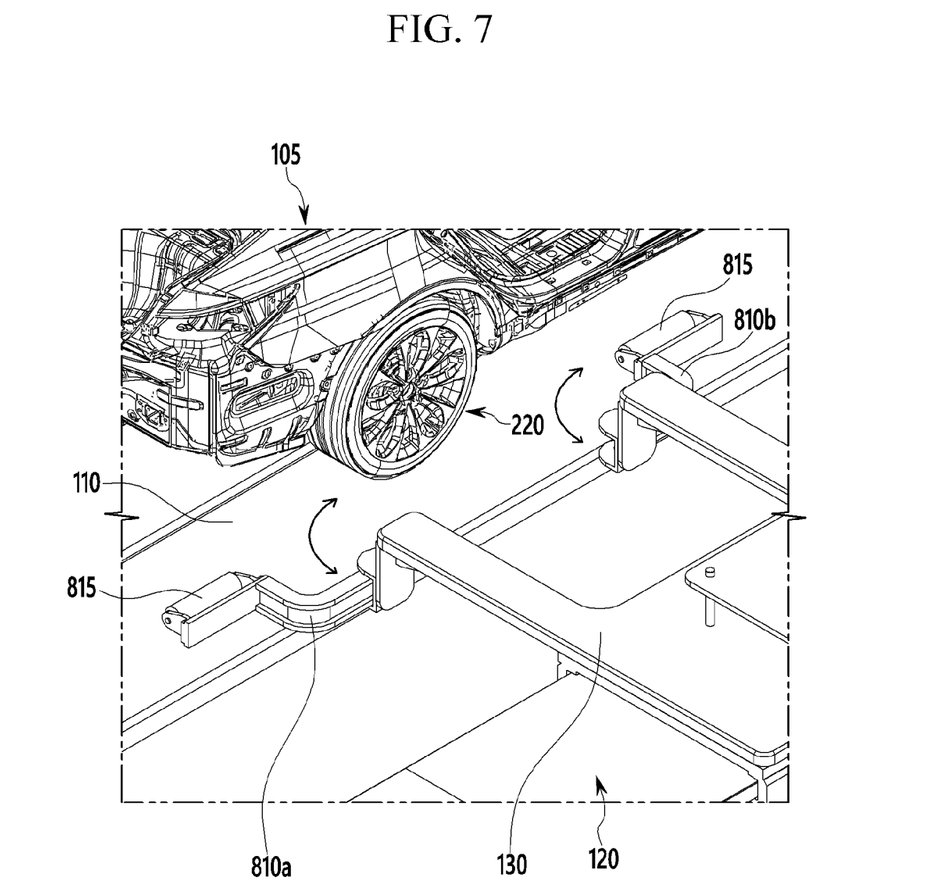
FIG. 7 is a partial perspective view illustrating a state before operating a wheel lifting apparatus according to an exemplary embodiment of the present disclosure.
Figure 11:
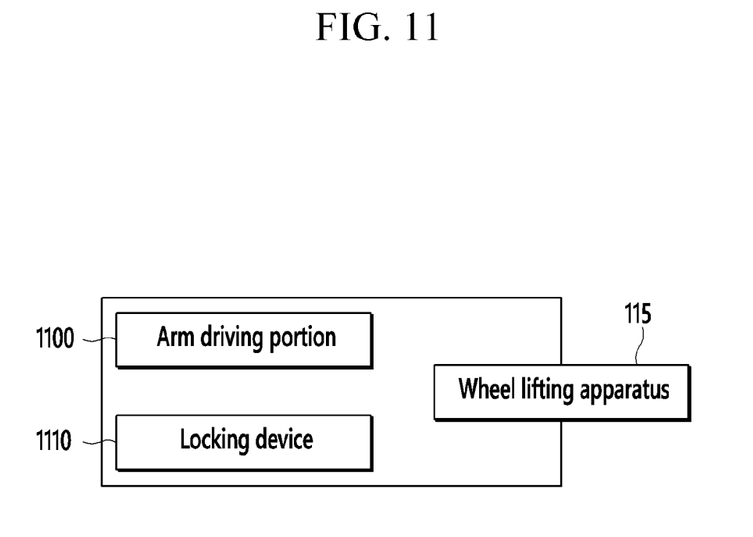
FIG. 11 is a schematic diagram of a wheel lifting apparatus according to an exemplary embodiment of the present disclosure.

FIG. 7 is a partial perspective view illustrating a state before operating a wheel lifting apparatus according to an exemplary embodiment of the present disclosure, and FIG. 11 is a schematic diagram of a wheel lifting apparatus according to an exemplary embodiment of the present disclosure.

Referring to FIG. 7, the moving member 130 is disposed on the delivering apparatus 120, and the moving member 130 is disposed to move along the rail 125 in a moving direction of the conveyor 110 (Referring FIG. 1).

A first lifting arm 810a and a second lifting arm 810b are disposed to be rotated around a hinge (not shown) at both sides of an inside front end portion of the moving member 130, and the first lifting arm 810a is disposed at the rear of the wheel 220, and the second lifting arm 810b is disposed at the front of the wheel 220.

The wheel lifting apparatus 115 includes an arm driving portion 1100 (referring to FIG. 11) spreading the first lifting arm 810a and the second lifting arm 810b toward outsides or approaching the first lifting arm 810a and the second lifting arm 810b with each other toward a center, and a locking device 1110 fixing the first lifting arm 810a and the second lifting arm 810b on a state that the first lifting arm 810a and the second lifting arm 810b lift the wheel 220.

Further, a lifting roller 815 is rotatably disposed at the respective front end portions of the first lifting arm 810a and the second lifting arm 810b.

In an exemplary embodiment of the present disclosure, detailed descriptions about a structure of the arm driving portion 1100 spreading or approaching the first lifting arm 810a and the second lifting arm 810b and a structure of the locking device 1110 fixing the first lifting arm 810a and the second lifting arm 810b will be omitted.

Figure 8:
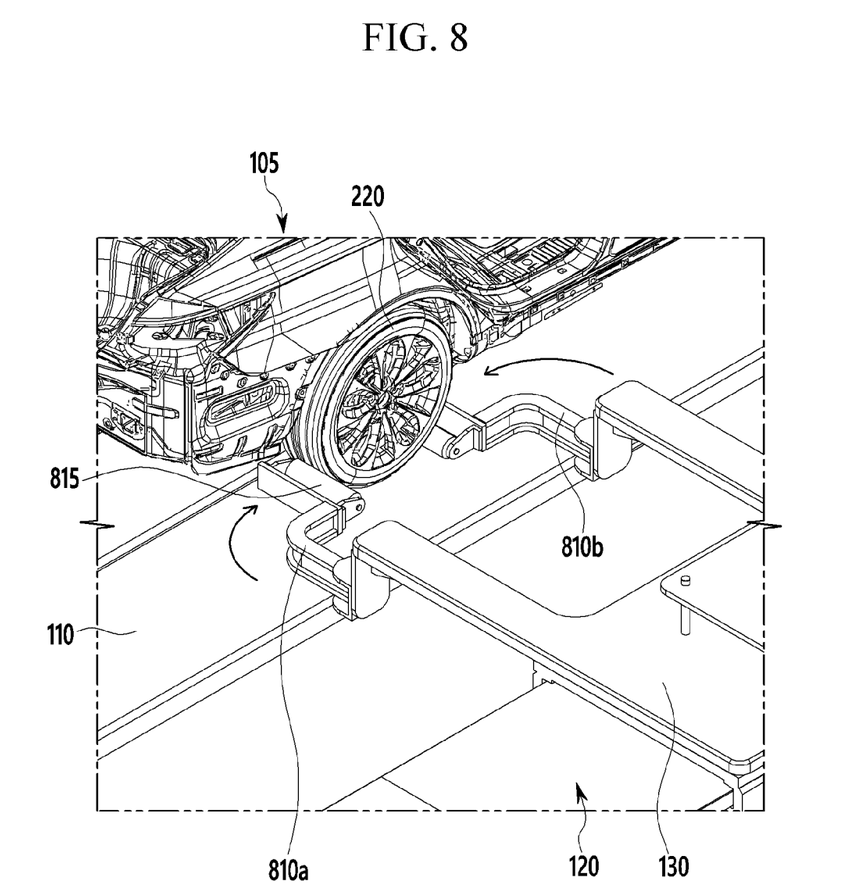
FIG. 8 is a partial perspective view illustrating a state after operating a wheel lifting apparatus according to an exemplary embodiment of the present disclosure.
Figure 9:
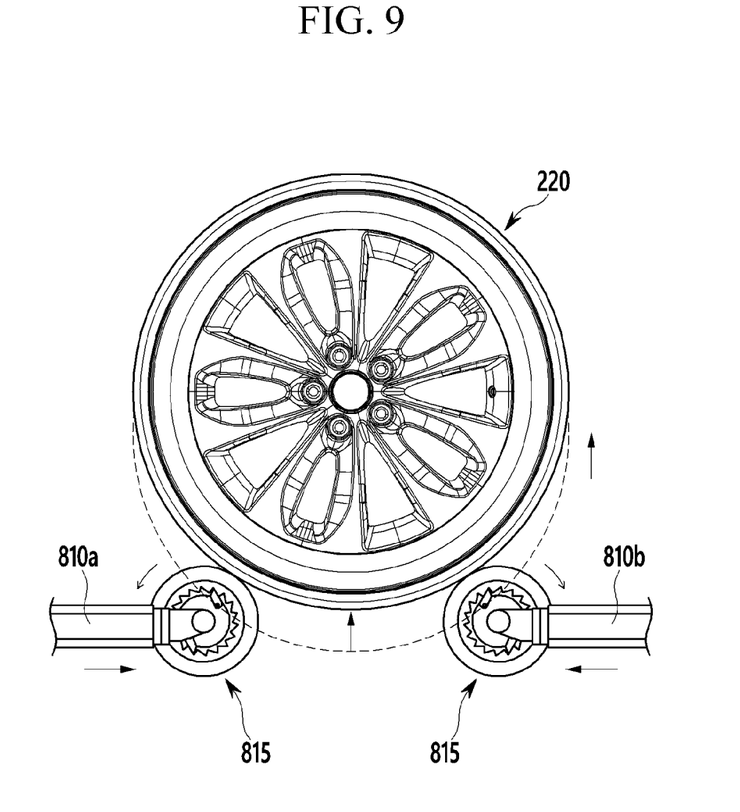
FIG. 9 is a side view showing operation principle of a wheel lifting apparatus according to an exemplary embodiment of the present disclosure.

FIG. 8 is a partial perspective view illustrating a state after operating a wheel lifting apparatus according to an exemplary embodiment of the present disclosure, and FIG. 9 is a side view showing operation principle of a wheel lifting apparatus according to an exemplary embodiment of the present disclosure.

Referring to FIG. 8 and FIG. 9, if the arm driving portion 1100 is operated to approach the first lifting arm 810a and the second lifting arm 810b, the lifting roller 815 rotatably disposed at the front end portions of the first lifting arm 810a and the second lifting arm 810b rotates so as to push the wheel 220 upwardly.

The locking device 1110 fixes motion of the first lifting arm 810a and the second lifting arm 810b. In addition, the wheel nut torque checking apparatus 150 is engaged to the wheel nut 310 of the wheel 220 so as to control or detect an engage torque of the wheel nut 310.

On the contrary to this, after an engage torque of the wheel nut 310 is controlled or detected, the locking device 1110 is released and the arm driving portion 1100 spreads the first lifting arm 810a and the second lifting arm 810b towards an outside.

Figure 10:
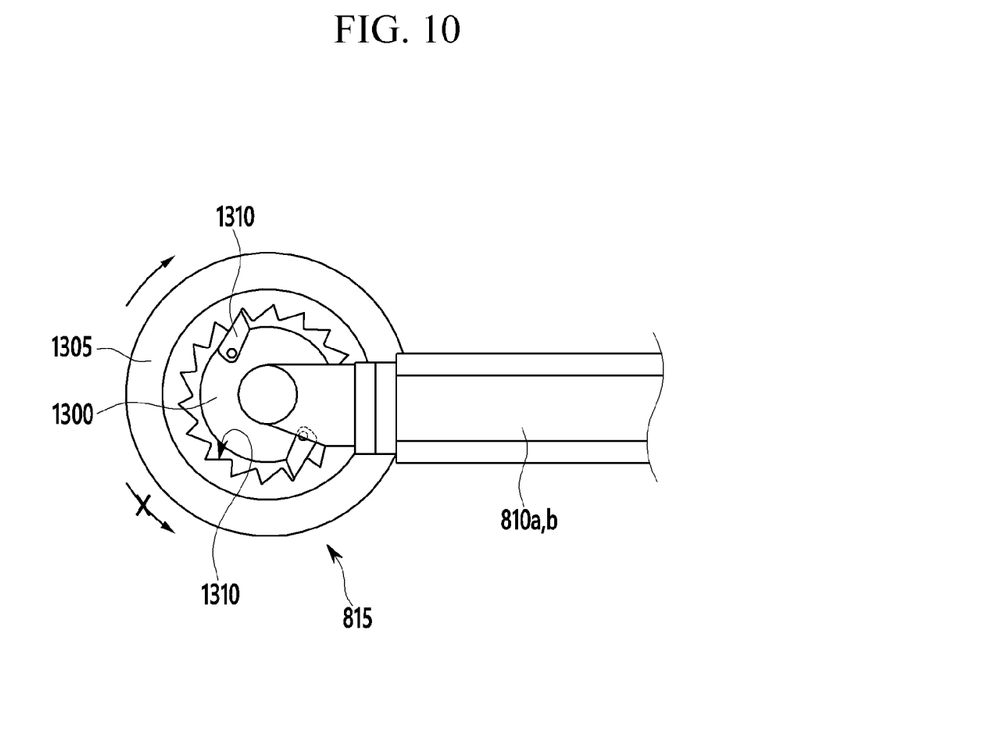
FIG. 10 is a partial side view of a wheel lifting apparatus according to an exemplary embodiment of the present disclosure.

FIG. 10 is a partial side view of a wheel lifting apparatus according to an exemplary embodiment of the present disclosure.

Referring to FIG. 10, a fixed roller 1300 is disposed at the front end portion of the lifting arm 810, and a rotational roller 1305 is disposed at an outside of the fixed roller 1300. The rotational roller 1305 is disposed to rotate around the fixed roller 1300.

A latching member 1310 is disposed between an exterior circumference of the fixed roller 1300 and an interior circumference of the rotational roller 1305. One end of the latching member 1310 is fixed to the fixed roller 1300 through a pin, and the other end thereof is hooked to a latching groove 1310 which is formed at an interior circumference of the rotational roller 1305.

Referring to FIG. 10, the rotational roller 1305 may be rotated in a clockwise direction through the latching member 1310, and may be fixed in a counterclockwise direction. On the contrary to this, the rotational roller 1305 may be rotated in a counterclockwise direction through the latching member 1310, and be fixed in a clockwise direction.

Therefore, the wheel lifting apparatus 115 fixes the wheel 220 on a state of lifting the wheel 220 such that the wheel 220 is not rotated.

Figure 12:
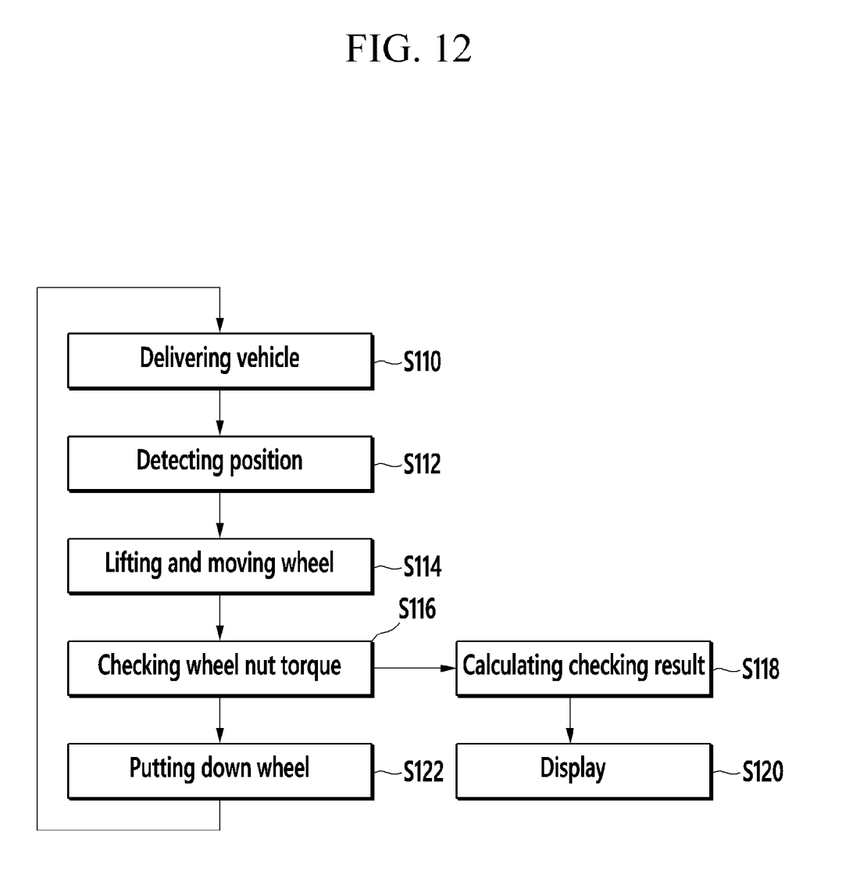
FIG. 12 is a flowchart of a wheel nut torque checking method according to an exemplary embodiment of the present disclosure.

FIG. 12 is a flowchart of a wheel nut torque checking method according to an exemplary embodiment of the present disclosure.

Referring to FIG. 12, in a wheel nut torque checking method, the vehicle 105 is moved on the conveyor 110 at a step S110.

At a step S112, positions of the wheel 220 and the wheel nut 310 of the vehicle 105 are detected by using the vision sensor 240.

At a step S114, the wheel lifting apparatus 115 spreads the first lifting arm 810a and the second lifting arm 810b and lifts the wheel 220. In addition, the wheel 220 and the vehicle 105 is moved with a set speed in a moving direction of the conveyor 110.

At a step S116, an engage torque of the wheel nut 310 engaged to the wheel 220 is detected by using the wheel nut torque checking apparatus 150 or the wheel nut 310 is engaged with a predetermined torque.

A checking result or an engaging result is calculated by the controller 190 at a step S118, and the controller 190 shows the result through a display at a step S120.

In addition, at a step S122, the wheel lifting apparatus 115 approaches the first lifting arm 810a and the second lifting arm 810b, and puts down the wheel 220 on the conveyor 110, and then detects or controls an engage torque of the wheel nut disposed at the vehicle.

While this disclosure has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A wheel nut engagement checking system for a vehicle delivered by a conveyor, comprising:
   a moving member disposed at one side of the conveyor;
   a wheel lifting apparatus disposed on the moving member, and lifting a wheel of the vehicle from the conveyor to a predetermined height;
   a wheel nut torque checking apparatus disposed on an arm of a robot that is disposed on the moving member, engaging a nut runner to a wheel nut of the wheel, and checking an engage torque of the wheel nut by rotating the nut runner; and a controller controlling a speed of the moving member, lifting the wheel to the predetermined height using the wheel lifting apparatus, moving the wheel nut torque checking apparatus using the robot to engage the nut runner to the wheel nut, and detecting the engage torque of the wheel nut by rotating the nut runner, wherein the wheel nut torque checking apparatus comprises:

the nut runner which is engaged to the wheel nut;
a nut rotating portion rotating the nut runner; and
a torque detecting sensor disposed on a torque transferring route between the nut rotating portion and the nut runner to detect a torque, and wherein the controller determines an engage condition of the wheel nut using a torque detection signal detected in the torque detecting sensor.

2. The wheel nut engagement checking system of claim 1, wherein the wheel lifting apparatus comprises:

first and second lifting arms rotatably disposed at a front and a rear of the moving member such that front end portions of the first and second lifting arms are disposed toward a lower portion of a center portion of the wheel; and lifting rollers rotatably disposed at the respective front end portions of the first and second lifting arms and contacting an exterior circumference of the wheel.

3. The wheel nut engagement checking system of claim 2, wherein the wheel lifting apparatus further comprises:

an arm driving portion providing a driving torque for spreading the first and second lifting arms or for approaching the first and second lifting arms to each other; and a locking device fixing the first and second lifting arms in a state where the first and second lifting arms lift the wheel.

4. The wheel nut engagement checking system of claim 2, wherein the lifting roller comprises:

a fixed roller fixed to each of the front end portions of the first and second lifting arms;

a rotational roller rotatably disposed at an outside of the fixed roller; and a latching member disposed between the fixed roller and the rotational roller so as to lock such that the rotational roller is rotated in one direction with respect to the fixed roller.

5. The wheel nut engagement checking system of claim 4, wherein:

a rear end portion of the latching member is disposed to be rotated around a pin of the fixed roller;

the rotational roller has a latching groove at an interior circumference of the rotational roller; and the rotational roller is not rotated in the other direction when a front end portion of the latching member is hooked to the latching groove.

6. The wheel nut engagement checking system of claim 1, wherein the wheel nut torque checking apparatus further comprises:

a vision sensor detecting a position of the wheel nut; and
a displacement sensor measuring a distance with a front object, and wherein the controller detects the wheel nut through the vision sensor and controls the robot such that the nut runner is engaged to the wheel nut.

7. The wheel nut engagement checking system of claim 6, wherein the wheel nut torque checking apparatus further comprises a runner moving portion disposed to vary a position of the nut runner, and the controller detects a position and a pitch of the wheel nut through the vision sensor or the displacement sensor and controls a position of the nut runner by controlling the runner moving portion depending on the detected position and pitch the wheel nut.

8. The wheel nut engagement checking system of claim 7, wherein the wheel nut torque checking apparatus has a guide slot to guide the movement of the nut runner.

9. The wheel nut engagement checking system of claim 8, wherein the controller detects a position and a number of the wheel nuts mounted to the wheel, and varies a position of the nut runner based on detected data such that the nut runners are engaged to all wheel nuts mounted to the wheel.

10. The wheel nut engagement checking system of claim 1, wherein the wheel nut engagement checking system is movable in a set direction or rotatable at the arm of the robot.

11. A wheel nut engagement checking method comprising steps of:

delivering a vehicle loaded on a conveyor;
lifting a wheel to a predetermined height from the conveyor using a lifting apparatus;
delivering the vehicle in a delivering direction with a set speed in a state where the vehicle is lifted by the lifting apparatus;
engaging a nut runner to a wheel nut by detecting the wheel nut fixing the wheel to an axle of the vehicle and moving a wheel nut torque checking apparatus;
detecting an engage torque of the wheel nut by rotating the nut runner; and
lowering the vehicle onto the conveyor after separating the lifting apparatus from the wheel, wherein the wheel nut torque checking apparatus comprises:

the nut runner engaged to the wheel nut;
a nut rotating portion rotating the nut runner; and
a torque detecting sensor disposed on a torque transferring route between the nut rotating portion and the nut runner to detect a torque, and wherein the controller determines an engage condition of the wheel nut using a torque detection signal detected in the torque detecting sensor.

12. The wheel nut engagement checking method of claim 11, wherein the lifting apparatus and the wheel nut torque checking apparatus are mounted on a moving member of a delivering apparatus.

13. The wheel nut engagement checking method of claim 12, wherein the wheel and the wheel nut are detected through a vision sensor disposed at the wheel nut torque checking apparatus.

14. The wheel nut engagement checking method of claim 13, wherein a position of the wheel nut is detected by the vision sensor, and a position of the nut runner is varied to correspond with the detected position.

15. The wheel nut engagement checking method of claim 12, wherein the wheel nut torque checking apparatus is delivered using a robot mounted to the moving member.

* * * * *